United States Patent [19]

Mummau

[11] 3,760,771

[45] Sept. 25, 1973

[54] METHOD AND APPARATUS FOR MINIMIZING THE FOULING OF A LIVESTOCK AREA AND PERMITTING AERATION AND VENTILATION AT A WATER RECEPTACLE

[76] Inventor: Ernest E. Mummau, Rt. 1, Box 266 A, Oxford, Pa. 19363

[22] Filed: Sept. 21, 1971

[21] Appl. No.: 182,457

[52] U.S. Cl. ............................................. 119/75
[51] Int. Cl. .......................................... A01k 07/00
[58] Field of Search ....................... 119/61, 75, 72

[56] References Cited
UNITED STATES PATENTS

| | | | |
|---|---|---|---|
| 1,749,808 | 3/1930 | Greene | 119/61 |
| 1,989,477 | 1/1935 | Ferris | 119/75 |
| 3,205,861 | 9/1965 | Moore | 119/61 |

FOREIGN PATENTS OR APPLICATIONS

| | | |
|---|---|---|
| 915,515 | 7/1954 | Germany |
| 314,461 | 6/1929 | Great Britain |

Primary Examiner—Hugh R. Chamblee
Attorney—James E. Cockfield

[57] ABSTRACT

Method and apparatus for minimizing the fouling of a livestock area and characterized by the use of coil spring means operable to define an impediment to licking of an upper portion of a water body by livestock.

8 Claims, 5 Drawing Figures

PATENTED SEP 25 1973 3,760,771

METHOD AND APPARATUS FOR MINIMIZING THE FOULING OF A LIVESTOCK AREA AND PERMITTING AERATION AND VENTILATION AT A WATER RECEPTACLE

GENERAL BACKGROUND, OBJECTS, AND SUMMARY OF INVENTION

Agricultural operations involving the nurturing and raising of livestock have been progressively improved so as to relieve farmers of many chores heretofore associated with livestock care.

In addition, continuous efforts have been made to improve the sanitation of areas where livestock feeding occurs.

All this notwithstanding, a substantial need has persisted for improving the sanitation of livestock feed areas without impairing the extent to which feeding and watering operations have been mechanized or automated.

For example, and particularly in connection with the care and raising of livestock such as cows, feed areas have been provided wherein water receptacles are operated under the control of livestock.

In a conventional installation of this nature, a water receptacle is superposed above a feed trough. In this conventional installation, a water flow controlling mechanism is contained in the interior of the water receptacle. This control mechanism is actuated by a cow's nose so as to initiate a flow of water into the receptacle for drinking purposes. The advantages of this automated arrangement are substantial. However, cows at times tend to slurp or lick the upper surface of a water body contained in such a receptacle. This slurping or licking action has tended to foul the feed area, and often has produced the undesirable effect of causing water to drop from the water receptacle into feed in the feed trough itself.

One known prior effort has been made to alleviate this problem. In this prior effort, a slit innertube is placed across the upper surface of a water receptacle. This substantially continuous rubber sheet prevents or impedes licking while a slit in the sheet enables a cow to insert its nose through the sheet and drink from a water body in the receptacle interior.

However, this sheet arrangement destroys the visibility of the water flow control mechanism and prevents aeration and exposure to light of the interior of the water receptacle. As a result, the receptacle may tend to become dirty and filled with stagnant water. In addition, Noxious odors and unsightly appearances may be generated because of the lack of adequate ventilation and exposure to light.

Recognizing the drawbacks of this prior art effort at minimizing the "slurping" and "licking" problems, it is the object of the present invention to provide a mechanism and technique for impeding "slurping" and "licking" of animal watering means while maintaining optimized visibility, ventilation and aeration of the interior of a water receptacle.

It is a particular object of the invention to provide such an improvement which may be readily adapted to conventional water receptacles with minimum cost.

Yet another object of the invention is to provide such an improvement which will afford continuous visibility of water flow control mechanism contained in the base of a water receptacle.

A still further object of the invention is to provide such an improvement which will readily permit the maintenance of a high degree of sanitation in a livestock watering area and facilitate cleaning operations.

In accomplishing certain of the foregoing objectives, a method of minimizing the fouling of a livestock area is presented through this invention. This method is characterized by the impeding of the licking of the surface of the water body of livestock by concurrently disposing impediment means transversely across the water body and affording continuous access to, aeration of, and exposure to light of the interior of the receptacle containing the water body.

In another sense, this method aspect of the invention embraces the disposition of such an impediment on a water receptacle while maintaining access to the interior of the receptacle, visibility of the interior of the receptacle, and aeration and exposure to light of the interior of the receptacle, the presence or absence of water in the receptacle notwithstanding.

Other aspects of the invention involve combinations of apparatus means which permit the aforesaid methods to be effectively and synergistically implemented.

A particularly significant apparatus aspect of the invention pertains to structural characteristics of a preferred impediment means.

These structural characteristics entail a first coil spring means operable to extend across an upper portion of a water body from which animals would drink. Also included in this apparatus is a second coil spring means operable to extend across this upper portion of the water body. The first and second coil springs are operable to cooperate to define the generally V-shaped, resilient impediment to licking of the water body. In addition the first and second coil spring means are operable to define a resiliently and transversely deformable periphery of a continuously open access passage. This periphery is operable to distend in response to the insertion of an animal nose into the open passage and permit the animal to drink from the water body. The first and second coil spring means are concurrently operable to define aeration and light exposure means comprising passage means disposed transversely outwardly of and between the first and second coil spring means. This plurality of passage means cooperates to permit aeration of and exposure to light of the water body.

DRAWINGS

In describing the invention reference will be made to a preferred embodiment illustrated in the appended drawings.

In the drawings:

FIG. 1 provides a perspective view of a livestock feed zone, illustrating water receptacle means superposed above feed trough means;

FIG. 2 provides an enlarged top plan view of one of the water receptacles illustrated in FIG. 1;

FIG. 3 provides a transverse vertical sectional view of FIG. 2 as viewed along section line 3—3 of FIG. 2;

FIG. 4 schematically illustrates the manner in which the coil spring impediment shown in FIG. 2 operates to impede licking of a water body by livestock; and FIG. 5 schematically illustrates the manner in which the FIG. 2 coil spring means may be distended to permit an animal's nose to move downwardly into a water body for drinking purposes and/or for the purpose of actuating a water flow control mechanism.

DETAILED DESCRIPTION OF PREFERRED EMBODIMENT

Figure 1:
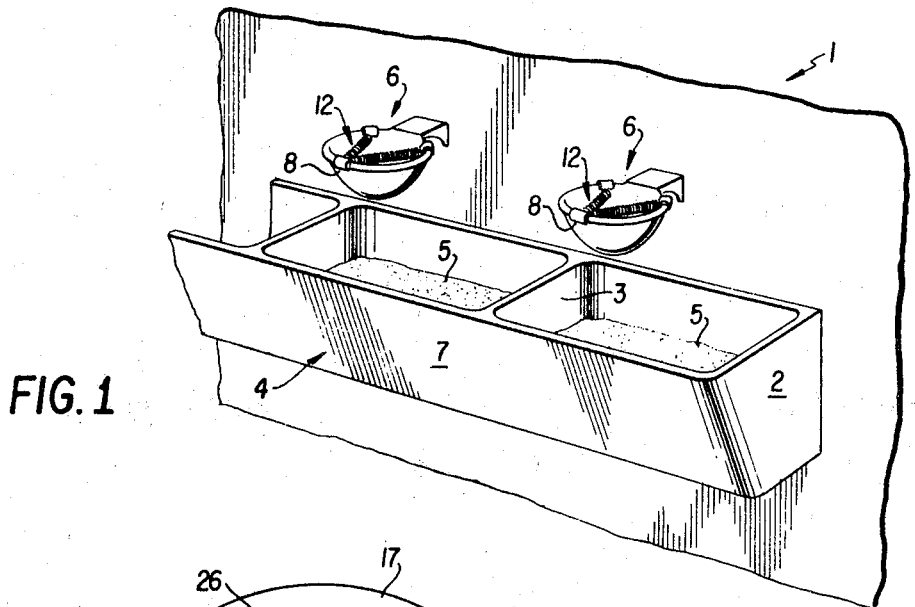

A representative livestock feed installation 1, depicted schematically in FIG. 1, illustrates a context in which the present invention may be practiced.

As shown in FIG. 1, installation 1 may comprise a feed trough 2. Feed trough 2 may be defined by transverse barrier means 3 into a plurality of longitudinally displaced feed zones 4.

Each such feed zone 4 is operable to contain grain or other feed, for example hay, which may comprise cow feed material.

Immediately above each compartment 4, containing the feed material 5, is a water receptacle 6.

With this arrangement, an individual cow will be able, when disposed adjacent a front side 7 of a trough zone 4 and a front side 8 of a receptacle 6 superposed above this zone, to alternately feed from the trough zone 4 and drink from the water receptacle 6.

As has been heretofore noted, the present invention is concerned with an anti-fouling arrangement and technique. This arrangement and technique enables feeding and drinking to take place in the same immediate area while substantially preventing or minimizing the extent to which water is slopped from the receptacle 6 into the feed zone 4 or onto adjacent ground or wall areas, so as to foul the overall feed area.

Figure 2:
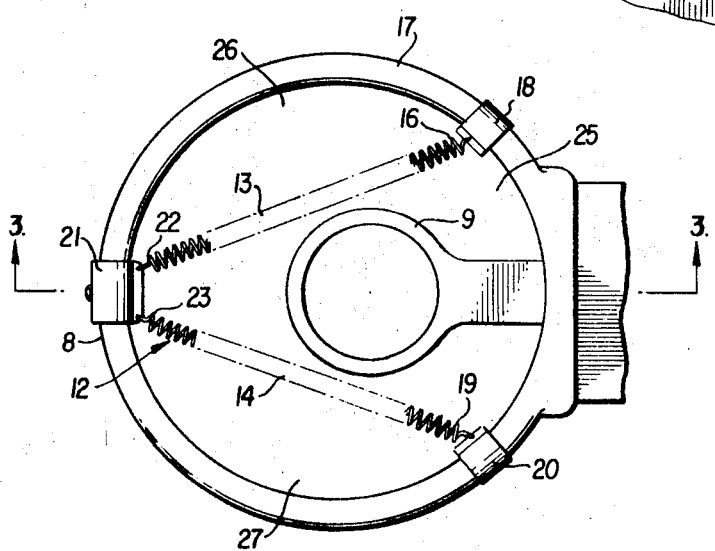
Figure 3:
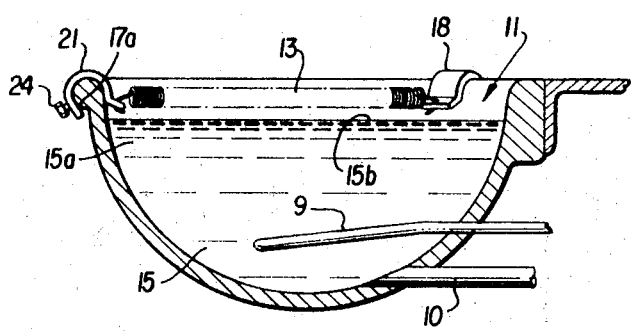

Water receptacle 6 may comprise a conventional cow-nose actuated lever 9, shown schematically in FIGS. 2 and 3. Each such control or actuating means 9 may be associated with a conventional valve mechanism which is operable to control the flow of water through a supply conduit 10. As shown generally in FIG. 3, each supply conduit 10 is operable to supply water to the base of the interior 11 of a receptacle 6.

Conventionally, a cow would actuate lever 9, so as to cause a flow of water from pipe 10 into the interior 11 of receptacle 6, by inserting its nose downwardly into the interior space 11 and pressing control lever 9 downwardly.

With the general context of the invention having been set forth, attention will now be devoted to the novel "anti-slop" or "anti-lick" aspects of the invention which prevent fouling of the feed area while permitting ventilation, aeration, and visibility of the water receptacle interior.

ANTI-FOULING OF FEED AREA

FIGS. 1, 2 and 3 illustrate structural details of an anti-fouling mechanism 12 which constitutes a preferred, but not necessarily restrictive, embodiment of the invention.

Anti-fouling mechanism 12 includes resilient means comprising first coil spring means 13 and second coil spring means 14. Each of the coil spring means 13 and 14 extends access an upper portion of a water body 15 contained within the interior space 11. The coil spring means 13 and 14 extend transversely across the upper portion 15a of the water body and would ordinarily be oriented in a general horizontal plane.

As shown in FIG. 2, the coil spring means 13 and 14 diverge away from the side 8 adjacent to which a cow would ordinarily stand, so as to provide a general V-shaped configuration.

A first end 16 of spring 13 is detachably secured to a rim 17 of receptacle 6 by an arcuate clip 18. A first end 19 of spring 14 is secured to a circumferentially spaced area of rim 17 by another such detachable arcuate clip 20. A third arcuate clip 21, mounted symmetrically on edge 17 at the center of side 8, and oriented symmetrically with relation to the positioning of clips 18 and 20, serves to detachably secure the other or second ends 22 and 23 of springs 13 and 14 to rim 17.

Each of the clips 18, 20 and 21 may be detachably locked or secured to the rim 17 by way of a threaded fastening screw 24. As generally shown in FIG. 3 in connection with clip 21, each such fastening screw 24 may pass through a lower and outer clip portion and abuttingly engage an under edge portion 17a of the receptacle rim 17.

Coil springs 13 and 14 provide a generally horizontally extending access passage 25 which is disposed transversely between the diverging springs 13 and 14. This generally V-shaped passage 25 is continuously open and is preferably superposed immediately above the control lever 9. This passage 25 affords continuous access to, and insures continuous visibility of, the control means lever 9.

Generally horizontally extending and segmentally configured passages 26 and 27 are disposed transversely outwardly of coil springs 13 and 14 respectively. These plural passage means 26 and 27 cooperate with access passage 25 to provide means permitting continuous aeration and exposure to light of the interior 11 of the receptacle 6 and the upper portion 15a of the water body 15.

Figure 5:
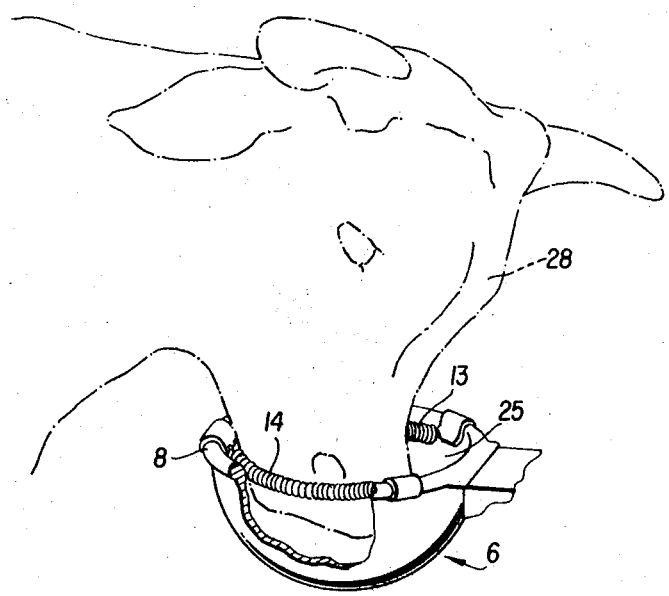

With the arrangement as heretofore described, a cow 28 may insert its nose into the passage 25, as generally shown in FIG. 5, and transversely outwardly deform the passage defining periphery means 13 and 14. This deformation of the spaced coil spring means 13 and 14, which define the periphery of passage 25, permits a cow 28 to cause its nose to engage the lever 9, as necessary, and obtain a fresh supply of water for drinking purposes.

Figure 4:
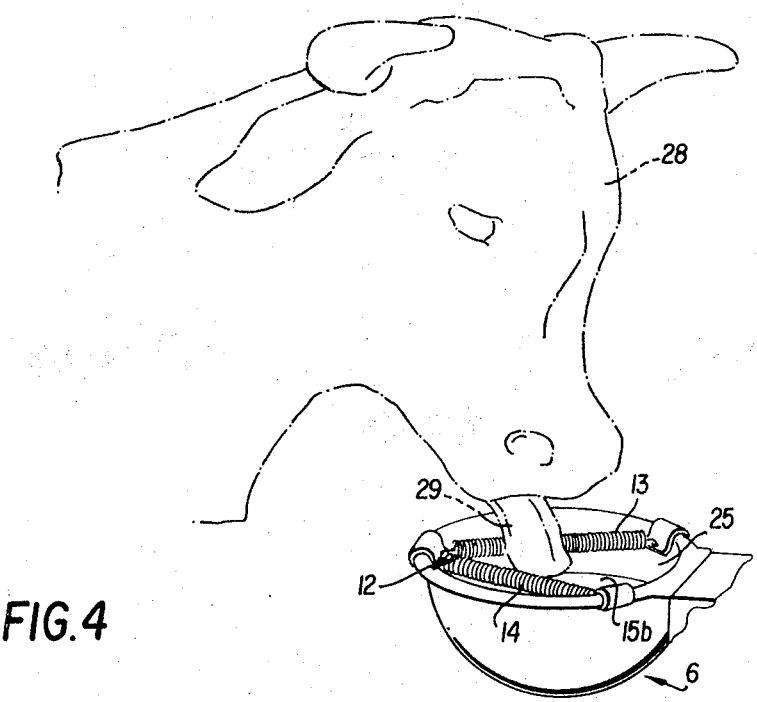

However, as schematically shown in FIG. 4, if the cow 28 should raise its nose out of the water body 15 and attempt to slurp or lick the upper water surface 15b, the cow tongue 29 would engage the coil springs 13 and 14. This engagement would produce an unpleasant sensation and cause the cow to terminate such slurping or licking action. In this manner the cow would be prevented from slurping water over and into the trough zone 4 and its surrounding vicinity and would thereby prevent fouling of the feed area and damaging of the feed mass 5.

MAJOR ADVANTAGES AND OVERALL SCOPE OF THE INVENTION

Substantial advantages of the invention have been discussed in relation to the preferred embodiment.

As will be recognized, the resilient mechanism 12 may be fabricated at minimum expense and be readily installed on conventional water receptacles.

As desired, the impedance mechanism 12 may be removed from the rim 17 for servicing, replacement or cleaning purposes.

Significantly, no special tools are required for the installation or removal of the mechanism 12.

With the mechanism 12 installed, a cow is not deterred from drinking because it is unable to see the interior of the receptacle or see the water control lever.

Most significantly, the surface passage means 25, 26 and 27 insure continuous aeration and ventilation of the interior 11 of the receptacle 6 so as to prevent the formation of noxious odors, stagnant water, etc. The unobstructed visibility of the interior space 11 enables a farmer to determine quickly when cleaning of the receptacle 6 is required.

While the V-shaped configuration of the impedance mechanism is believed to be particularly effective, it is possible that other arrangements of spaced resilient means may be employed while achieving the concurrent advantages of impedance to licking, visibility, aeration and exposure to light.

Those familiar with this disclosure and skilled in the animal feeding art may recognize additions, deletions, substitutions or other modifications which would fall within the purview of the invention as set forth in the appended claim.

What is claimed is:

1. An apparatus for minimizing the fouling of a livestock feed area said apparatus comprising:
   feed trough means;
   water receptacle means for containing a water body, said water receptacle means having an edge portion and superposed generally above said feed trough means;
   water supply means, operable to supply a water body to said water receptacle means,
   animal nose actuated control means contained within said water receptacle means and engagable by a nose of an animal to effect water flow controlling operation of said water supply means; and
   anti-licking means carried by said water receptacle means, operable to impede licking of the surface of said water body by livestock, and including
      resilient means extending transversely of the edge portion of said water receptacle means and operable to impede licking by an animal of an upper portion of said water body,
      continuously open access means affording continuous access to, and continuous visibility of, said control means;
      aeration and light exposure means defined by said continuously open access means and generally horizontally extending and segmentally configured passages operable to provide continuous ventilation and exposure to light of substantially said entire upper portion of said water body, and
      detachable clip means operable to detachably support said resilient means on said water receptacle means.

2. An apparatus as described in claim 1 wherein:
   said resilient means comprises
      first coil spring means extending across said upper portion of said water body, and
      second coil spring means extending across said upper portion of said water body,
      said first and second coil spring means cooperating to define a generally V-shaped, resilient impediment to licking, with the V-shape of said impediment diverging away from a side of said water receptacle means adjacent to which an animal would ordinarily stand;
   said access means comprises
      a continuously open, generally V-shaped passage disposed between said first and second coil spring means,
      said generally V-shaped passage diverging away from said side of said water receptacle means adjacent to which an animal would ordinarily stand;
      said first and second coil spring means providing a resiliently and transversely deformable passage periphery operable to distend in response to the insertion of an animal's nose and permit said animal to drink water from said water body and actuate said control means;
   said aeration and light exposure means comprises
      a plurality of passage means disposed transversely outwardly of said first and second coil spring means, and
      said generally V-shaped passage of access means,
      said plurality of passage means and said generally V-shaped passage cooperating to permit aeration of and exposure to light of substantially the entire upper surface of said water body and interior portions of said water receptacle means extending above said upper surface of said water body; and
   said detachable clip means comprises
      a first generally arcuate clip engaging one end of said first coil spring means and operable to detachably engage an edge portion of said water receptacle means, and
      a second, generally arcuate clip engaging one end of said second coil spring means and operable to detachably engage an edge portion of said water receptacle means, and
      a third, generally arcuate clip engaging another end of said first coil spring means and another end of said second coil spring means and operable to detachably engage an edge portion of said water receptacle means.

3. An apparatus for minimizing the fouling of a livestock area, said apparatus comprising:
   resilient means including
      first coil spring means operable to extend across an upper portion of a water receptacle means operable to contain a water body from which animals would drink, and
      second coil spring means operable to extend across said upper portion of said water receptacle means,
      said first and second coil spring means being operable to cooperate to define a generally V-shaped, resilient impediment to licking of said water body;
   attachment means for attaching said first and second coil spring means to said water receptacle means;
   said first and second coil spring means being operable to define
      a resiliently and transversely deformable periphery of a continuously open passage, which periphery is operable to distend in response to the insertion of an animal nose and permit said animal to drink water from said water body, and
   aeration and light exposure means comprising
      a plurality of passage means disposed transversely outwardly of said first and second coil spring means, and
      an access passage disposed transversely between said first and second coil spring means, said plurality of passage means and said access passage cooperating to permit aeration of and exposure to light of the interior of said water receptacle means.

4. A method of minimizing the fouling of a livestock feed area, said method comprising:
  disposing water receptacle means above feed trough means,
  dividing an upper portion of the water receptacle means into a plurality of portions to impede the licking of the surface of a water body by livestock by disposing V-shaped resilient impediment means extending generally transversely of the upper portion thereof;
  providing continuous access to apportion of said water body, with said continuous access enabling livestock to drink from said water body;
  substantially continuously aerating, and exposing to light, said upper portion of said water body;
  substantially continuously maintaining said upper portion of said said water body visible; and
  permitting an animal to cause feeding of water to said water receptacle means by inserting its nose through a passage defined by said V-shaped resilient impediment means and engaging water flow control means.

5. An apparatus for minimizing the fouling of a livestock feed area, said apparatus comprising:
  feed trough means;
  water receptacle means, superposed generally above said feed trough means;
  water supply means, operable to supply a water body to said water receptacle means;
  animal nose actuated control means, contained within said water receptacle means and engagable by a nose of an animal to effect water flow controlling operation of said water supply means; and
  anti-licking means carried by said water receptacle means, operable to impede licking of the surface of said water body by livestock and including:
    resilient means extending transversely of said water body and operable to impede licking of an upper portion of said water body by an animal,
    said resilient means further comprising:
      first coil spring means extending across said upper portion of said water body, and
      second coil spring means extending across said upper portion of said water body,
      said first and second coil spring means cooperating to define a generally V-shaped, resilient impediment to licking, with the v-shape of said impediment diverging away from a side of said water receptacle means adjacent to which an animal would ordinarily stand;
    continuously open access means affording continuous access to, and continuous visibility of, said control means, said access means further comprising:
      a continuously open, generally V-shaped passage disposed between said first and second coil spring means,
      said generally V-shaped passage diverging away from said side of said water receptacle means adjacent to which an animal would ordinarily stand,
      said first and second coil spring means providing a resiliently and transversely deformable passage periphery operable to distend in response to the insertion of an animal's nose and permit said animal to drink said water from said water body and actuated said control means;
    aeration and light exposure means operable to provide continuous ventilation and exposure to light of substantially said entire upper portion of said water body,
    said aeration and light exposure means further comprising:
      a plurality of passage means disposed transversely outwardly of said first and second coil spring means, and said generally V-shaped passage of access means,
      said plurality of passage means and said generally V-shaped passage cooperating to permit aeration of exposure to light of substantially the entire upper surface of said water body and interior portions of said water receptacle means extending above said upper surface of said water body; and
    detachable clip means operable to detachably support said resilient means on said water receptacle means,
    said detachable clip means comprising:
      a first generally arcuate clip engaging one end of said first coil spirng means and operable to detachably engage an edge portion of said water receptacle means and a second, generally arcuate clip engaging one end of said second coil spring means and operable to detachably engage an edge portion of said water receptacle means, and a third, generally arcuate clip engaging another end of said first said coil spring means and another end of said second coil spring means and operable to detachably engage an edge portion of said water receptacle means.

6. An apparatus for minimizing the fouling of a livestock feed area, said apparatus comprising:
  feed trough means;
  water receptacle means, superposed generally above said feed trough means;
  water supply means, operable to supply a water body to said water receptacle means;
  animal nose actuated control mmeans, contained within said water receptacle means and engagable by a nose of an animal to effect water flow controlling operation of said water supply means; and anti-licking means carried by said water receptacle means, operable to impede licking of the surface of said water body by livestock and including:
    resilient means extending transversely of said water body and operable to impede licking of an upper portion of said water body by an animal,
    said resilient means further comprising:
      first elongate flexible means extending across said upper portion of said water body, and
      second elongate flexible means extending across said upper portion of said water body,
      said first and second flexible elongate means cooperating to define a generally V-shaped, resilient impediment to licking, with the V-shape of said impediment diverging away from a side of said water receptacle means adjacent to which an animal would ordinarily stand;
    continuously open access means affording continuous access to, and continuous visibility of, said control means, said access means further comprising:
a continuously open, generally V-shaped passage disposed between said first and second flexible elongate means, said generally V-shaped passage diverging away from said side of said water receptacle means adjacent to which an animal would ordinarily stand,
said first and second flexible elongate means providing a resiliently and transversely deformable passage periphery operable to distend in response to the insertion of an animal's nose and permit said animal to drink said water from said water body and actuated said control means;
aeration and light exposure means operable to provide continuous ventilation and exposure to light of substantially said entire upper portion of said water body,
said aeration and light exposure means further comprising:
a plurality of passage means disposed transversely outwardly of said first and second flexible elongate means, and said generally V-shaped passage of access means;
said plurality of passage means and said generally V-shaped passage cooperating to permit aeration of and exposure to light of substantially the entire upper portion of said water body and interior portions of said water receptacle means extending above said upper surface of said water body; and
detachable clip means operable to detachably support said resilient means on said water receptacle means,
said detachable clip means comprising:
a first generally arcuate clip engaging one end of said first flexible elongate means and operable to detachably engage an edge portion of said water receptacle means, and
a second, generally arcuate clip engaging one end of said second flexible elongate means and operable to detachably engage an edge portion of said water receptacle means, and
a third, generally arcuate clip engaging another end of said first flexible elongate means and another end of said second flexible elongate means and operable to detachably engage an edge portion of said water receptacle means.

7. An apparatus for minimizing the fouling of a livestock area, said apparatus comprising:
resilient means including:
first flexible elongate means operable to extend across an upper portion of a water body from which animals would drink, and
second flexible elongate means operable to extend across said upper portion of said water body,
said first and second flexible elongate means being operable to cooperate to define a generally V-shaped resilient impediment to licking of said water body;
said first and second flexible elongate means being operable to define:
a resiliently and transversely deformable periphery of a continuously open passage, which periphery is operable to distend in response to the insertion of an animal's nose and permits said animal to drink water from said water body, and
aeration and light exposure means comprising:
a plurality of passage means disposed transversely outwardly of said first and second flexible elongate means, and
an access passage disposed transversely between said first and second flexible elongate means,
said plurality of passage means and said access passage cooperating to permit aeration of and exposure to light of the interior of said water receptacle means.

8. An apparatus for minimizing the fouling of a livestock feed area said apparatus comprising:
water receptacle means for containing a water body, said water receptacle means having an edge portion;
water supply means operable to supply a water body to said water receptacle means,
animal nose actuated control means contained within said water receptacle means and engagable by a nose of an animal to effect water flow controlling operation of said water supply means; and
anti-licking means carried by said water receptacle means, operable to impede licking of the surface of said water body by livestock, and including
resilient means extending transversely of the edge portion of said water receptacle means and operable to impede licking by an animal of an upper portion of said water body;
continuously open access means affording continuous access to, and continuous visibility of, said control means;
aeration and light exposure means defined by said continuously open access means and generally horizontally extending and segmentally configured passages operable to provide continuous ventilation and exposure to light of substantially said entire upper portion of said water body; and
detachable clip means operable to detachably support said resilient means on said edge portion of said water receptacle means.

* * * * *